July 27, 1926.
C. C. FARMER
GASKET HOLDER
Filed May 21, 1924
1,593,712
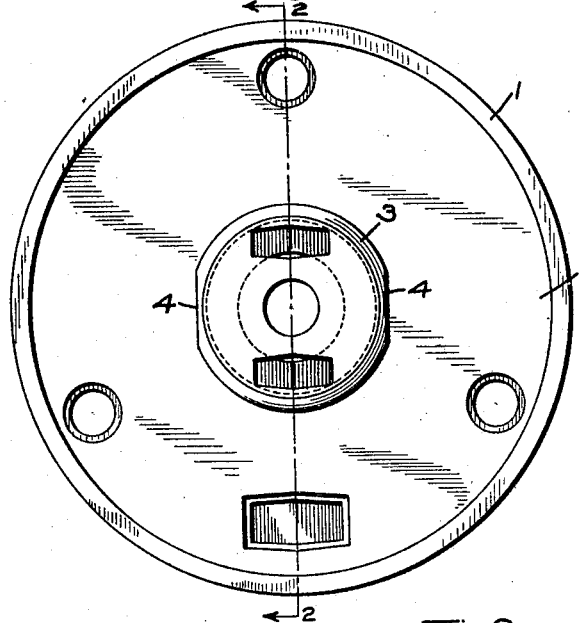
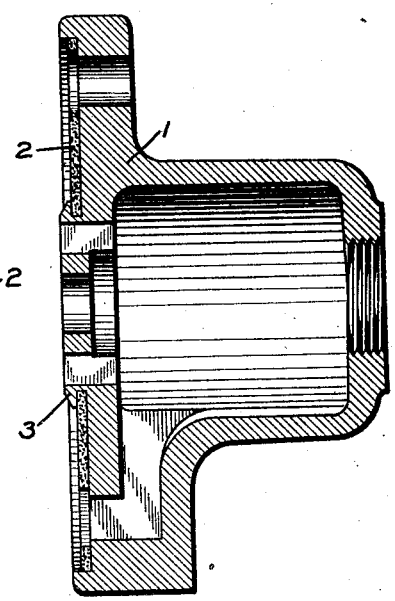
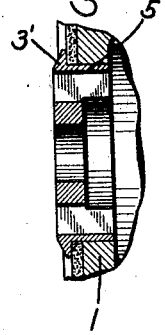
INVENTOR
CLYDE C. FARMER
BY *Wm. M. Cady*
ATTORNEY Patented July 27, 1926.

1,593,712

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

GASKET HOLDER.

Application filed May 21, 1924. Serial No. 714,994.

This invention relates to gaskets and has for its object to provide means for holding the gasket in place.

In the accompanying drawing; Fig. 1 is a face view of a triple valve cylinder cap and gasket with my improvement applied thereto; Fig. 2 a section on the line 2—2 of Fig. 1; and Fig. 3, a section similar to Fig. 2, showing a slightly modified form of my invention.

With certain applications of seating gaskets, such as the gasket which is interposed between the usual triple valve casing cylinder and its cap, it is found that the triple valve piston in engaging the gasket has a tendency to deform the gasket, so that the central portion of the gasket tends to bulge out away from the gasket seat, after the triple valve has been in service for a period of time.

In order to prevent this, I provide means for holding the central portion of the gasket in place.

The triple valve cylinder cap 1, as shown in the drawing is provided, as is usual, with a circular recessed gasket face, to which is applied a gasket 2. According to my invention, a centrally disposed annular flange 3 is formed integral with the cap 1, so as to provide an annular recess corresponding in width with the thickness of the kasket 2 and adapted to snugly receive the central portion of the gasket.

The flange 3 is cut away at opposite points, as shown at 4, 4, so that the gasket may be readily applied by first slipping the gasket into the recess at one side of the cut away portions 4, 4, and then stretching the gasket slightly to fit same in the portion of the recess at the other side of the cut away portions 4, 4.

Instead of forming the flange 3 as an actually integral portion of the cap 1, the flange may be formed on a bushing 5, adapted to be secured in the cap 1, as shown in Fig. 3.

By providing means for holding the gasket in place, dirt or foreign matter is prevented from working under the gasket, in such a way as to cause bulging of the gasket.

Having now described my invention, what I claim as new and desire to secure by Letters Patent, is:—

1. The combination with a flexible gasket and a member having a face for receiving said gasket, of an annular centrally disposed flange associated with said member and providing an annular recess adapted to receive the central portion of said gasket to thereby hold said gasket against distortion.

2. The combination with a flexible gasket and a member having a face for receiving said gasket, of a centrally disposed annular flange formed integral with said member and providing an annular recess for receiving the central portion of said gasket, said flange being cut away at opposite sides to facilitate insertion of the gasket in said recess.

In testimony whereof I have hereunto set my hand.

CLYDE C. FARMER.